(12) United States Patent
Hara et al.

(10) Patent No.: US 9,975,416 B2
(45) Date of Patent: May 22, 2018

(54) VEHICLE BODY STRUCTURE AND ONBOARD BATTERY FOR VEHICLE

(71) Applicant: FUJI JUKOGYO KABUSHIKI KAISHA, Tokyo (JP)

(72) Inventors: Toshiyuki Hara, Tokyo (JP); Takayuki Tokunaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days. days.

(21) Appl. No.: 15/280,342

(22) Filed: Sep. 29, 2016

(65) Prior Publication Data
US 2017/0087972 A1    Mar. 30, 2017

(30) Foreign Application Priority Data

Sep. 30, 2015  (JP) ................. 2015-193223

(51) Int. Cl.
| | |
|---|---|
| *B60K 1/04* | (2006.01) |
| *B60R 16/04* | (2006.01) |
| *B62D 25/20* | (2006.01) |
| *B60K 11/06* | (2006.01) |
| *B60K 1/00* | (2006.01) |

(52) U.S. Cl.
CPC ................ *B60K 1/04* (2013.01); *B60R 16/04* (2013.01); *B62D 25/20* (2013.01); *B62D 25/2027* (2013.01); *B60K 11/06* (2013.01); *B60K 2001/005* (2013.01); *B60K 2001/0416* (2013.01); *B60K 2001/0438* (2013.01); *B60Y 2400/61* (2013.01)

(58) Field of Classification Search
CPC .............. B60K 1/04; B60K 2001/0416; B60K 2001/005; B60L 11/1877; B60L 11/1879; B60R 16/04
See application file for complete search history.

(56) References Cited

U.S. PATENT DOCUMENTS

| | | | |
|---|---|---|---|
| 2001/0015568 A1* | 8/2001 | Motozawa ........... | B60N 2/4221 297/216.16 |
| 2003/0070858 A1* | 4/2003 | Kondo .................... | B60K 1/04 180/291 |
| 2004/0079569 A1* | 4/2004 | Awakawa ................ | B60K 1/04 180/68.5 |
| 2004/0235315 A1* | 11/2004 | Masui ..................... | B60K 1/04 439/34 |

(Continued)

FOREIGN PATENT DOCUMENTS

JP        5206110 B        6/2013

*Primary Examiner* — Frank B Vanaman
(74) *Attorney, Agent, or Firm* — Chip Law Group

(57) ABSTRACT

Some vehicles are equipped with an onboard battery. The onboard battery includes a holding frame having a frame-shaped part, a housing case that is held by the holding frame, being inserted into the frame-shaped part, and battery modules housed in the housing case. For such a vehicle with the onboard battery, the vehicle body structure includes a displacement restricting part and a disposition depression. The displacement restricting part restricts an upward displacement of the onboard battery in a collision from behind is formed at a position facing a front end portion of the holding frame. The disposition depression is formed in a floor panel and the onboard battery is disposed to be at least partly inserted into the disposition depression.

12 Claims, 14 Drawing Sheets

(56) References Cited

U.S. PATENT DOCUMENTS

| | | | | |
|---|---|---|---|---|
| 2007/0040418 A1* | 2/2007 | Ohkuma | ............... | B60K 1/04 297/15 |
| 2008/0000703 A1* | 1/2008 | Shindou | ............... | B60K 1/04 180/68.5 |
| 2008/0062622 A1* | 3/2008 | Fukazu | ............... | B60K 1/04 361/678 |
| 2011/0284299 A1* | 11/2011 | Takahashi | ............... | B60K 1/04 180/65.21 |
| 2013/0075173 A1* | 3/2013 | Kato | ............... | B60K 1/04 180/68.5 |

* cited by examiner

VEHICLE BODY STRUCTURE AND ONBOARD BATTERY FOR VEHICLE

CROSS-REFERENCE TO RELATED APPLICATIONS

The present application claims priority from Japanese Patent Application No. 2015-193223 filed on Sep. 30, 2015, the entire contents of which are hereby incorporated by reference.

BACKGROUND

1. Technical Field

The present invention relates to the technical fields of a vehicle body structure that is equipped with an onboard battery including a housing case and a battery module housed in the housing case and of the onboard battery.

2. Related Art

Onboard batteries are installed in various vehicles, such as automobiles, in order to supply electric power to motors and other various electrical components. In recent years, in particular, vehicles such as electric vehicles (EV), hybrid electric vehicles (HEV), and plug-in hybrid electric vehicles (PHEV) have gained widespread use. In these electricity-driven vehicles, onboard batteries having a high electricity-storage function are installed.

An onboard battery includes a housing case and a battery module housed in the housing case. The battery module is configured by, for example, arranging a plurality of battery cells (secondary batteries), such as nickel hydrogen batteries or lithium ion batteries. In some onboard batteries to be installed in an electric vehicle or the like, in order to retain a high electricity-storage function, a plurality of battery modules are disposed in the housing case and battery cells in each of the battery modules are coupled in series or in parallel.

An example of such an onboard battery is disposed in a trunk formed in a rear part of a vehicle (see Japanese Patent No. 5206110).

The onboard battery described in Japanese Patent No. 5206110 is located between rear side frames of a vehicle body, which are provided apart from each other in the transversal direction, the onboard battery being partly inserted into a disposition depression having an upward opening in a floor panel.

In a vehicle equipped with the onboard battery described in Japanese Patent No. 5206110, the onboard battery is disposed in the front side of the trunk, and a space behind the onboard battery in the trunk is formed as a crushable area. Accordingly, when a load is applied from behind by collision from behind the vehicle, the pair of rear side frames is crushed to absorb a shock, so that the onboard battery is protected.

On the other hand, in the vehicle equipped with the onboard battery described in Japanese Patent No. 5206110, if collision from behind the vehicle is severe, there is a possibility that the rear side frames are crushed and also a large load is applied from behind to the onboard battery. When a load is applied to the onboard battery, an inclined part of the housing case is guided to a front surface part forming the disposition depression, and the entire onboard battery is moved diagonally up-forward so as to avoid a cross-member located in front of the disposition depression. Accordingly, the onboard battery does not collide with the cross-member, which suppresses an excessive load to a battery module housed inside the housing case.

However, if the vehicle in which the onboard battery is disposed on the front side of the trunk as described in Japanese Patent No. 5206110 is involved in a severe collision, the entire onboard battery is moved diagonally up-forward. Hence, there is a possibility that part of the housing case comes into contact with a portion with high rigidity in the vehicle body, such as a portion where a seat hinge bracket supporting a turning shaft of rear seats and the floor panel are coupled to the cross-member.

When part of the housing case comes into contact with such a portion with high rigidity, the housing case may bend at the contact portion as an origin. This may damage the housing case, and damage or break each component disposed inside the housing case.

As an example other than a collision from behind the vehicle, if a rear part of the vehicle equipped with the onboard battery collides with a telegraph pole etc. due to spin or the like (i.e., if so-called pole collision occurs), a portion between a pair of rear side frames in the vehicle body collides with the telegraph pole etc. in some cases. In this case, the telegraph pole etc. applies a large load to the onboard battery to move the entire onboard battery diagonally up-forward; thus, part of the housing case may come into contact with a portion with high rigidity, so that the housing case may bend at the contact portion as an origin. This may damage the housing case, and damage or break each component disposed inside the housing case.

SUMMARY OF THE INVENTION

It is desirable to prevent each component disposed inside a housing case from being damaged or broken in collision.

An aspect of the present invention provides a vehicle body structure for a vehicle. The vehicle is equipped with an onboard battery. The onboard battery includes a holding frame having a frame-shaped part, a housing case that is held by the holding frame, being inserted into the frame-shaped part, and battery modules housed in the housing case. For such a vehicle with the onboard battery, the structure includes: a displacement restricting part that restricts an upward displacement of the onboard battery in a collision from behind is formed at a position facing a front end portion of the holding frame; and a disposition depression that is formed in a floor panel and into which the onboard battery is disposed to be at least partly inserted.

The displacement restricting part may be formed on a seat hinge bracket that supports a turning shaft of rear seats.

The seat hinge bracket may be fixed to a cross-member with the floor panel located between the seat hinge bracket and the cross-member.

An upper end portion of the displacement restricting part may be provided with a projecting part for a restriction projecting rearward.

A reinforcing member may be mounted on an inner surface of a front end portion of the housing case, and a lower end portion of the displacement restricting part may be located at a same height as a height of the reinforcing member.

Another aspect of the present invention provides an onboard battery for a vehicle, including: a holding frame including a frame-shaped part; a housing case that is held by the holding frame, being inserted into the frame-shaped part; and battery modules housed in the housing case. The onboard battery is disposed to be at least partly inserted into a disposition depression in a floor panel, and a front end portion of the holding frame is located at a position facing a displacement restricting part that restricts an upward displacement in a collision from behind.

A reinforcing member may be mounted on an inner surface of a front end portion of the housing case, and the reinforcing member may be located at a same height as a height of a lower end portion of the displacement restricting part.

BRIEF DESCRIPTION OF THE DRAWINGS

FIG. 3 is an exploded perspective view of a housing case and the like;

DETAILED DESCRIPTION

Figure 1:
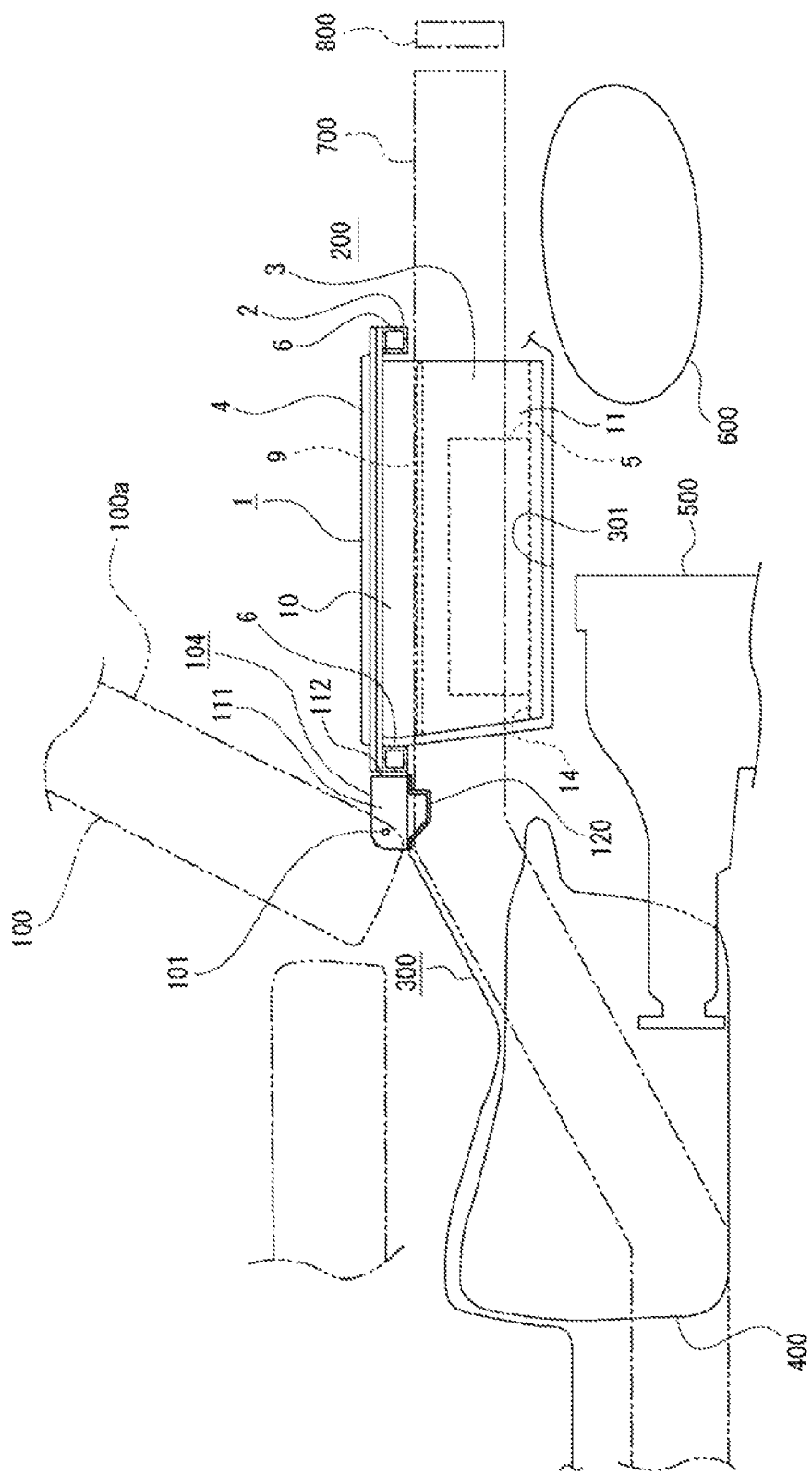
FIG. 1 illustrates an implementation of the present invention together with FIGS. 2 to 18, and is a schematic side view illustrating a state or the like of installation of an onboard battery.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

An implementation of an onboard battery of the present invention will be described below with reference to the appended drawings.

Figure 2:
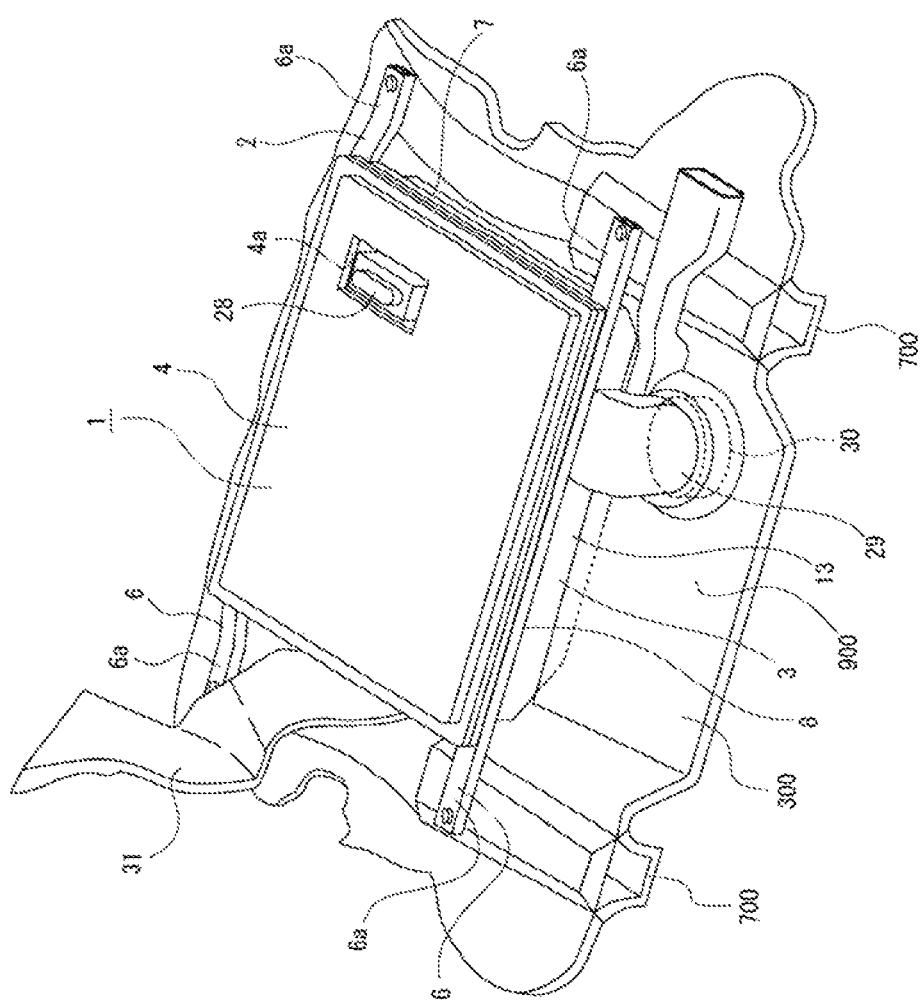
FIG. 2 is a perspective view illustrating a state or the like of installation of an onboard battery.
Figure 3:
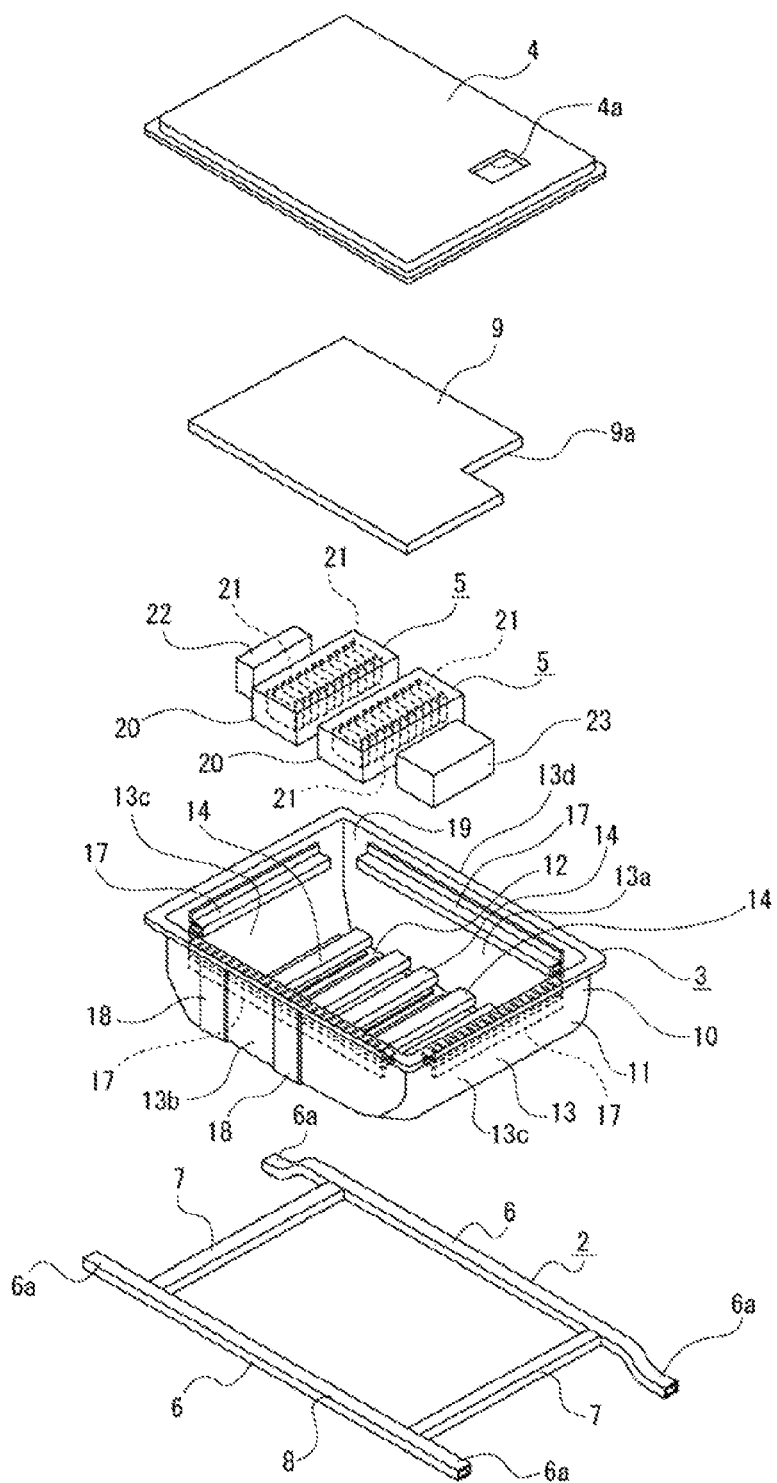

An onboard battery 1 includes a holding frame 2, a housing case 3, a cover body 4, and two battery modules 5 (see FIGS. 1 to 3).

The onboard battery 1 is at least partly disposed on a floor panel 300 in a trunk 200 located behind rear seats 100. The floor panel 300 is provided with a disposition depression 301 having an upward opening in the trunk 200. A front surface part forming the disposition depression 301 of the floor panel 300 is an inclined surface part 300*a* that is inclined so as to undergo forward displacement as going upward.

Below the floor panel 300 are located a fuel tank 400, two rear suspensions 500, and a muffler 600. The fuel tank 400 is located below the rear seats 100.

Figure 4:
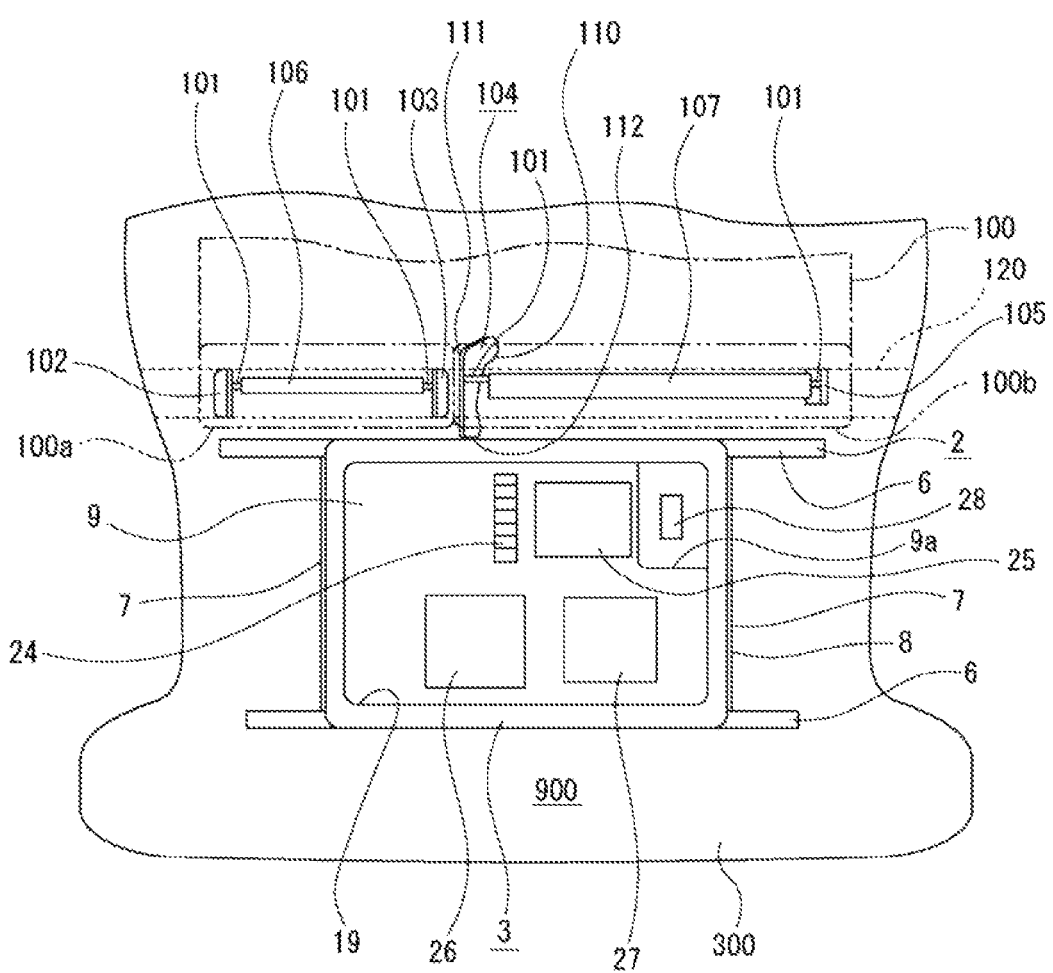
FIG. 4 is a plan view illustrating a state or the like of installation of an onboard battery.

The rear seats 100 are supported by seat hinge brackets 102, 103, 104, and 105 via turning shafts 101 (see FIGS. 1 and 4). The rear seats 100 include, for example, a first backrest 100*a* and a second backrest 100*b* into which a backrest has been divided in the transversal direction, and a bottom surface part of the first backrest 100*a* and a bottom surface part of the second backrest 100*b* are fixed, respectively, to fixing bars 106 and 107 extending in the transversal direction.

The seat hinge brackets 102, 103, 104, and 105 are fixed to the floor panel 300, apart from each other in the transversal direction. To the lower surface side of the floor panel 300 is fixed a cross-member 120 extending in the transversal direction, and the seat hinge brackets 102, 103, 104, and 105 are fixed to the floor panel 300, right above the cross-member 120 (see FIGS. 4 and 5). Accordingly, the seat hinge brackets 102, 103, 104, and 105 are fixed to the cross-member 120 with the floor panel 300 located therebetween, thus having high strength.

One end portions of the turning shafts 101 are coupled to left and right both end portions of the fixing bars 106 and 107. The other end portions of the turning shafts 101 are supported by the seat hinge brackets 102, 103, 104, and 105 to be freely turnable. Accordingly, the first backrest 100*a* located on the left side is supported by the seat hinge brackets 102 and 103 via the fixing bar 106 and two turning shafts 101 to be turnable around the two turning shafts 101, and the second backrest 100*b* located on the right side is supported by the seat hinge brackets 104 and 105 via the fixing bar 107 and two turning shafts 101 to be turnable around the two turning shafts 101.

Figure 6:
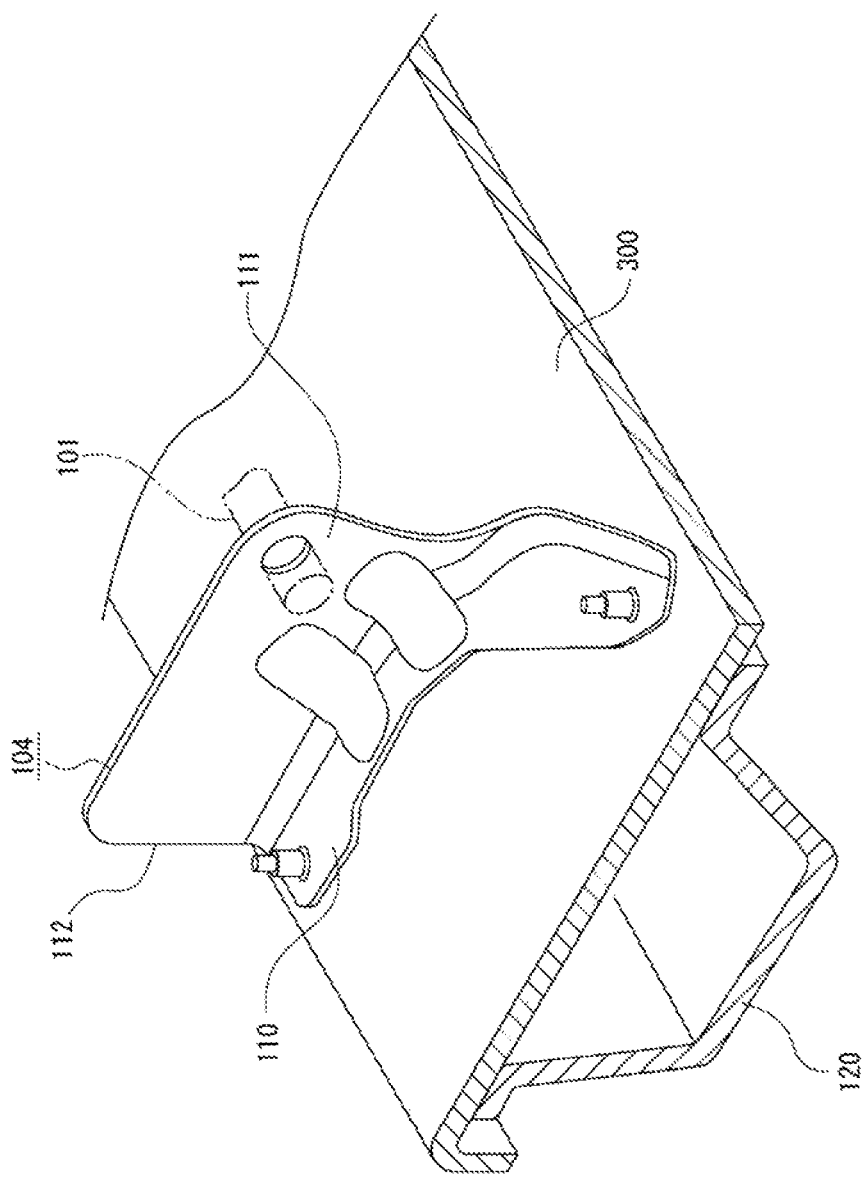
FIG. 6 is an enlarged perspective view of a seat hinge bracket.

The seat hinge bracket 104 supporting the second backrest 100*b* includes a fixed part 110 facing the vertical direction and a shaft support part 111 projecting upward from one side edge of the fixed part 110 (see FIG. 6). The fixed part 110 is fixed to the floor panel 300, and the turning shaft 101 is supported at a position close to a front end of the shaft support part 111.

Like the seat hinge bracket 104, the seat hinge brackets 102, 103, and 105 also include a fixed part and a shaft support part; detailed description thereof is omitted.

Figure 5:
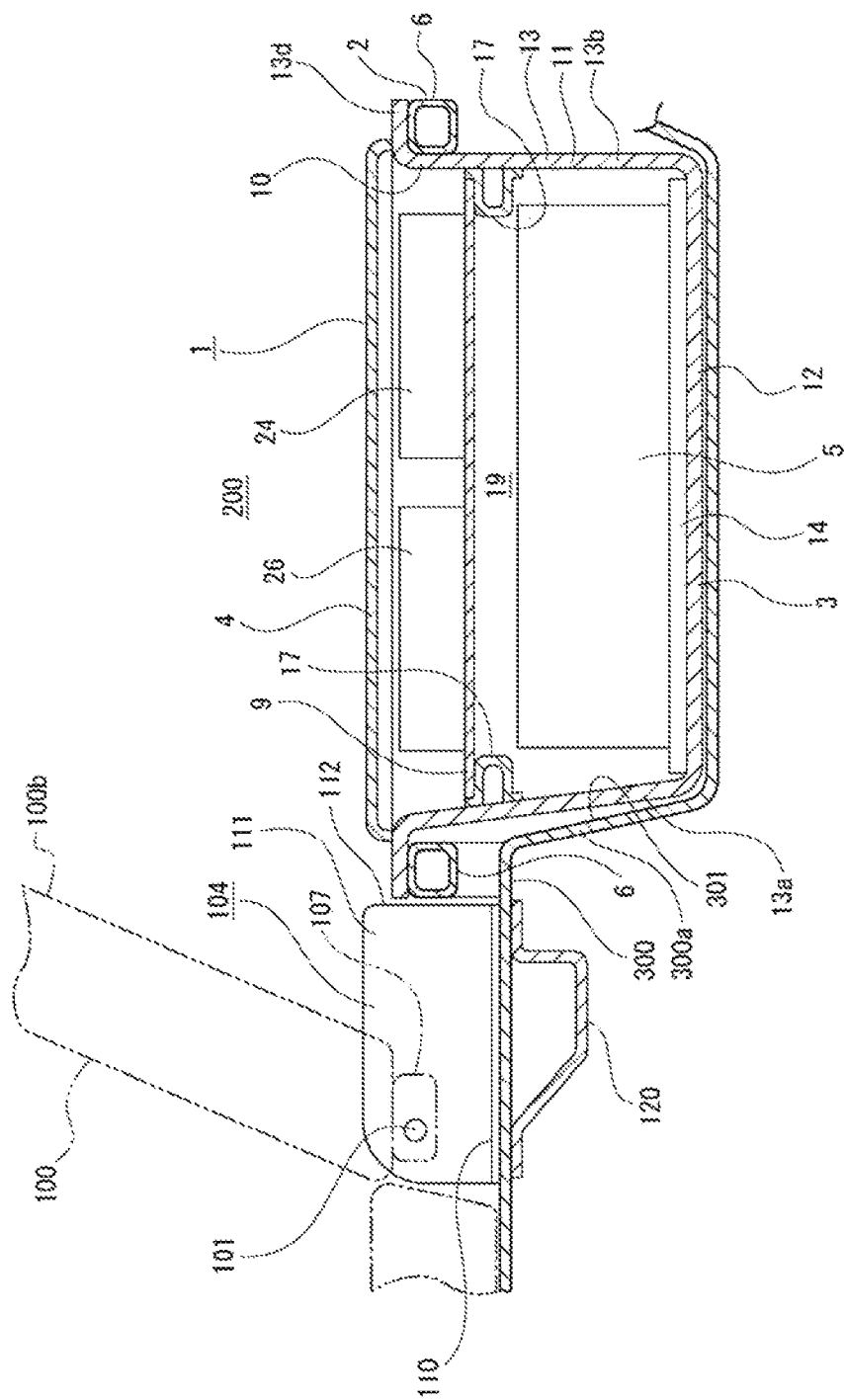
FIG. 5 is a cross-sectional view illustrating a state or the like of installation of an onboard battery.

A rear edge of the shaft support part 111 of the seat hinge bracket 104 is formed to be perpendicular or substantially perpendicular, and the rear edge is formed as a displacement restricting part 112 facing rearward or substantially rearward (see FIGS. 5 and 6).

The holding frame 2 includes two first portions 6 that extend in the transversal direction and are located apart from each other in the longitudinal direction and two second portions 7 that extend in the longitudinal direction and are located apart from each other in the transversal direction, which are coupled into the shape of parallel crosses (see FIGS. 1 to 3). Left and right both end portions 6*a* of the two first portions 6 project sideward (outward) from the two second portions 7. A portion of the holding frame 2 excluding the left and right both end portions 6*a* of the two first portions 6 is provided as a rectangular frame-shaped part 8.

Inside the housing case 3 is disposed a partition plate 9 with a flat plate shape. One side portion of a front end portion of the partition plate 9 is provided with a notch 9a. In the housing case 3, a portion above the partition plate 9 is provided as an upper housing part 10, and a portion below the partition plate 9 is provided as a lower housing part 11. Accordingly, the partition plate 9 partitions the inside of the housing case 3 into an upper stage and a lower stage, and in the lower stage, for example, the two battery modules 5 are housed apart from each other in the transversal direction.

The housing case 3 includes a bottom surface part 12 facing the vertical direction and a peripheral surface part 13 whose lower edge is continuous with an outer peripheral edge of the bottom surface part 12. The peripheral surface part 13 includes a front wall part 13a, a rear wall part 13b, two side wall parts 13c, and a mounted part 13d. The mounted part 13d is formed in the shape of a flange protruding outward from upper edges of the front wall part 13a, the rear wall part 13b, and the two side wall parts 13c.

The housing case 3 is inserted into the frame-shaped part 8 of the holding frame 2 from above, so that a lower surface of the mounted part 13d is in contact with an upper surface of the frame-shaped part 8, and the mounted part 13d is fastened to the frame-shaped part 8 with a bolt or the like to be fixed to the holding frame 2 (see FIG. 2).

One side portion of a front end portion of the cover body 4 is provided with a communicating hole 4a.

The both end portions 6a of the two first portions 6 of the holding frame 2 of the onboard battery 1 are fixed to the floor panel 300 with a bolt or the like.

In a state where the holding frame 2 is fixed to the floor panel 300, the first portion 6 on the front side of the holding frame 2 is located to face the displacement restricting part 112 of the seat hinge bracket 104 in the longitudinal direction (see FIG. 5).

The onboard battery 1 is disposed in the trunk 200 in a state where a lower stage including the lower housing part 11 is inserted into the disposition depression 301 of the floor panel 300 (see FIGS. 1, 2, and 5). Accordingly, an upper stage including the upper housing part 10 is located above an upper surface of the floor panel 300.

Right beside the lower stage of the housing case 3 are located two rear side frames 700 extending in the longitudinal direction, which are skeletal frames of the vehicle body, and rear ends of the two rear side frames 700 are located behind the onboard battery 1 (see FIGS. 1 and 2). Behind the two rear side frames 700 is disposed a bumper beam 800 extending in the transversal direction.

A space behind the housing case 3 in the trunk 200 is formed as a crushable area 900.

Figure 7:
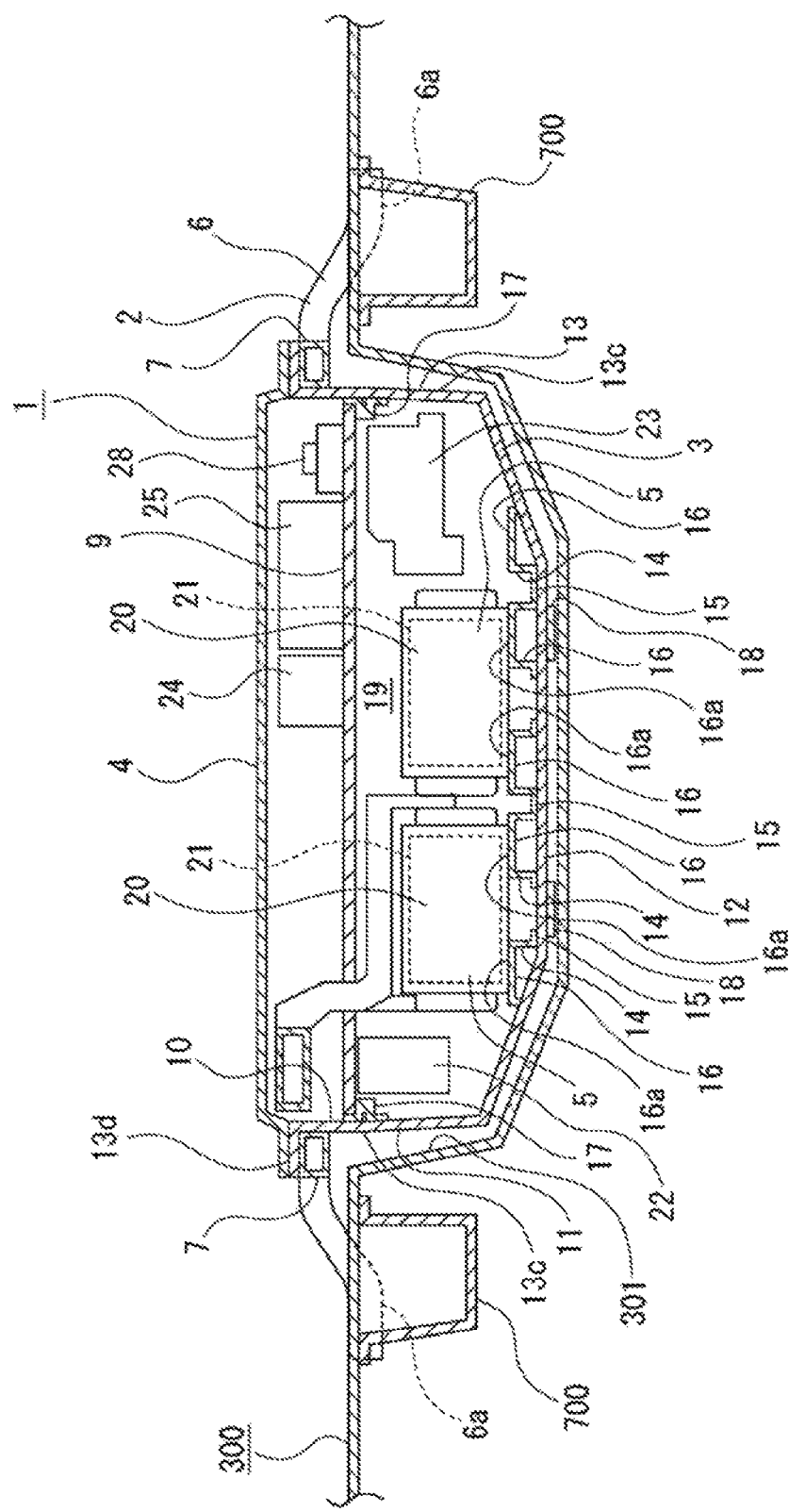
FIG. 7 is a cross-sectional view illustrating a state or the like of disposition of each component in a housing case.

As described above, the lower housing part 11 of the housing case 3 is disposed in the disposition depression 301 by the holding frame 2 being fixed to the floor panel 300, and the lower housing part 11 is located between the two rear side frames 700 located apart from each other in the transversal direction (see FIG. 7).

On an upper surface of the bottom surface part 12 of the housing case 3, three shock-absorbing members 14 are mounted apart from each other in the transversal direction (see FIG. 3). Each shock-absorbing member 14 includes a disposition surface part 15 with a flat plate shape facing the vertical direction and a projecting part 16 projecting upward from the disposition surface part 15 and having a U-shaped cross-section with a downward opening, which are integrally formed. One projecting part 16 is provided or two projecting parts 16 are provided apart from each other in the transversal direction, and an upper surface part of the projecting part 16 is provided as a base part 16a. The shock-absorbing member 14 is mounted on the bottom surface part 12 in an orientation in which the projecting part 16 extends in the longitudinal direction, and front and rear both end portions of the shock-absorbing member 14 are coupled, respectively, to front and rear both end portions of the bottom surface part 12.

On inner surfaces of the front wall part 13a, the rear wall part 13b, and the two side wall parts 13c of the peripheral surface part 13 of the housing case 3 are mounted respective reinforcing members 17. The reinforcing member 17 is formed with a hat-shaped cross-section having an opening facing the inner surface of the peripheral surface part 13, and is mounted on each of the front wall part 13a, the rear wall part 13b, and the two side wall parts 13c in an orientation extending in the transversal direction or the longitudinal direction.

The mounting of the reinforcing members 17 on the peripheral surface part 13 of the housing case 3 increases the strength of the housing case 3, which strengthens protection of each component disposed inside the housing case 3.

The partition plate 9 is placed and mounted on the reinforcing members 17, and the reinforcing members 17 have both the function of reinforcing the housing case 3 and the function of serving as a mounting member for mounting the partition plate 9. The reinforcing member 17 mounted on the front wall part 13a is located at the same height as a lower end portion of the displacement restricting part 112 of the seat hinge bracket 104 (see FIG. 5).

On an outer surface of the housing case 3, two deflection-preventing members 18 each formed in a substantially U-shape having an upward opening are mounted apart from each other in the transversal direction (see FIG. 3). The deflection-preventing member 18 is mounted at a position extending across the front wall part 13a, the bottom surface part 12, the rear wall part 13b, and the mounted part 13d.

The mounting of the two deflection-preventing members 18 on the housing case 3 prevents deflection of the housing case 3 in a state where the housing case 3 is inserted into the frame-shaped part 8 to be held by the holding frame 2, which ensures a stable disposition state of each component disposed inside the housing case 3.

An internal space 19 of the housing case 3 is a space where each component described later is housed, in addition to the two battery modules 5.

Figure 8:
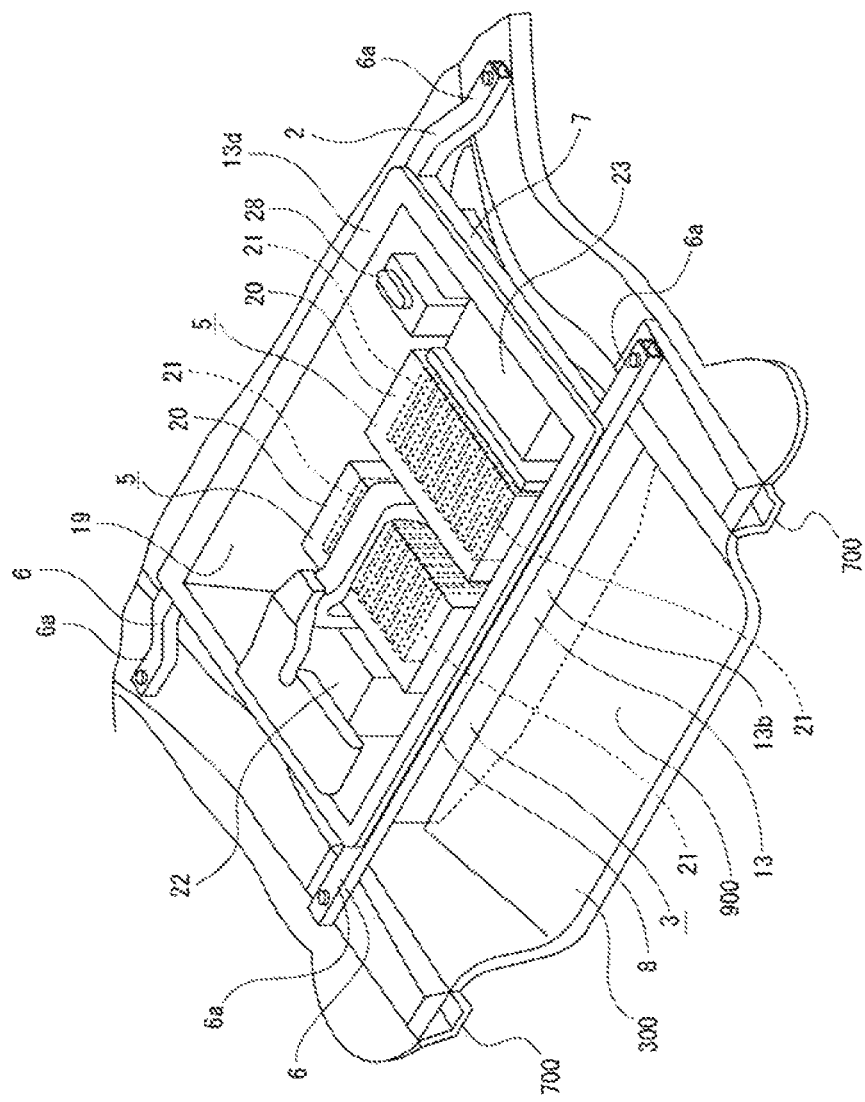
FIG. 8 is a perspective view illustrating a state of disposition of each component in a lower stage of a housing case.

The battery module 5 includes a cell cover 20 with a box shape whose long-side direction is the longitudinal direction and a plurality of battery cells 21 arranged side by side in the longitudinal direction inside the cell cover 20 (see FIG. 3). The two battery modules 5 are housed apart from each other in the transversal direction in the lower housing part 11 of the housing case 3 (see FIGS. 7 and 8).

The battery module 5 is disposed to extend over the two base parts 16a of the two adjacent projecting parts 16 of the shock-absorbing members 14.

In the lower housing part 11 of the housing case 3, a battery control unit 22 and a junction box 23 are housed on opposite sides in the transversal direction with the two battery modules 5 located therebetween. Accordingly, the two battery modules 5, the battery control unit 22, and the junction box 23 are housed in the lower stage in the internal space 19 of the housing case 3, and are located at or below the height of upper surfaces of the two rear side frames 700 (see FIG. 7). The battery control unit 22 has a function of governing the entire control of the onboard battery 1. The junction box 23 includes a relay, a fuse, a connector terminal, etc.

As described above, the lower housing part 11 of the housing case 3 is located between the two rear side frames 700, and the two battery modules 5, the battery control unit 22, and the junction box 23 housed in the lower housing part 11 are also located between the two rear side frames 700.

Figure 9:
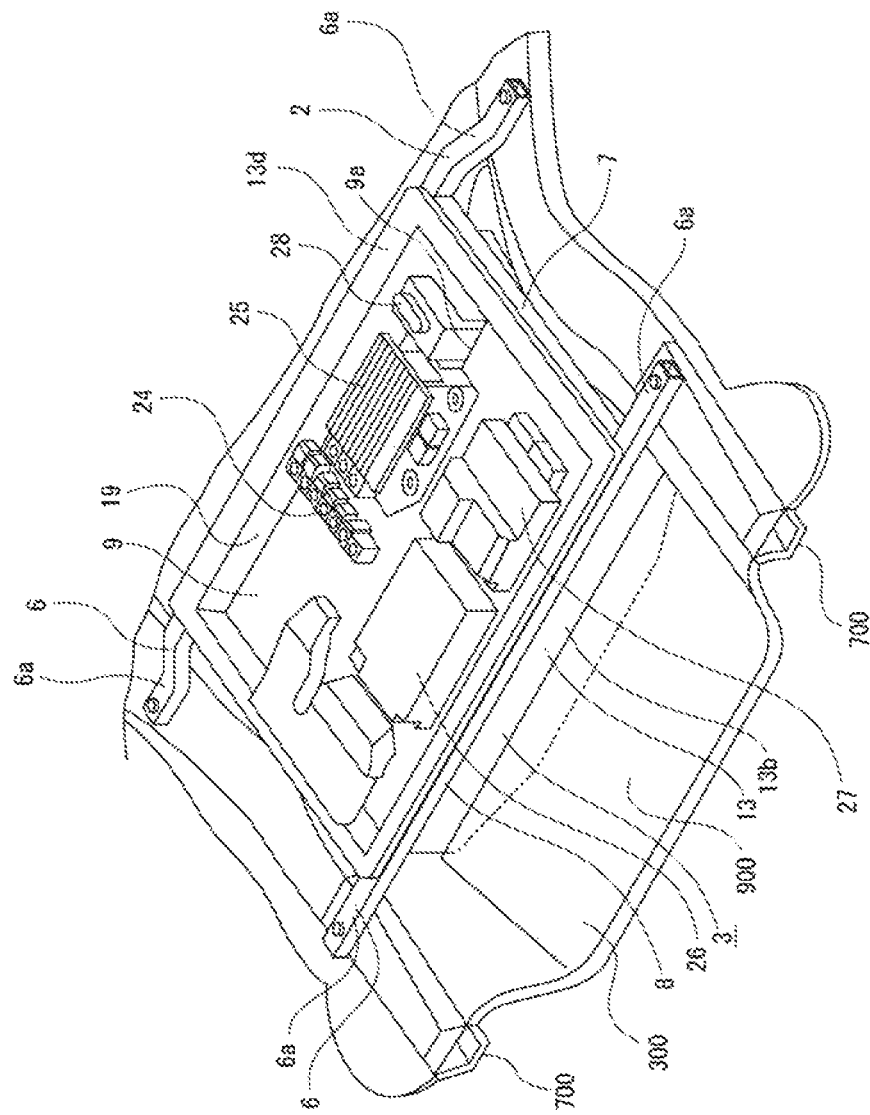
FIG. 9 is a perspective view illustrating a state of disposition of each component in an upper stage of a housing case.

In the upper housing part 10 of the housing case 3, a terminal strip 24 and a pump inverter 25 of an electric oil pump are arranged side by side in the transversal direction in a front-half part, and a DC/DC converter 26 and a unit inverter 27 of the battery control unit 22 are arranged side by side in the transversal direction in a rear-half part (see FIGS. 7 and 9). Accordingly, the terminal strip 24, the pump inverter 25, the DC/DC converter 26, and the unit inverter 27 are housed in the upper stage in the internal space 19 of the housing case 3.

In the housing case 3, a service plug 28 is disposed in front of the junction box 23. The service plug 28 is located at the notch 9a of the partition plate 9. The service plug 28 is located at a position viewable through the communicating hole 4a of the cover body 4 in a state where the cover body 4 is mounted on the housing case 3.

As described above, the two battery modules 5, the battery control unit 22, the junction box 23, the terminal strip 24, the pump inverter 25, the DC/DC converter 26, and the unit inverter 27 are disposed inside the housing case 3; all electrical components for driving the onboard battery 1 are disposed inside the housing case 3, being covered by the cover body 4.

Accordingly, the electrical components for driving the onboard battery 1 can be shielded from electromagnetic noise from the outside. The strengthening of electromagnetic shielding ensures an excellent driving state of the onboard battery 1.

Figure 10:
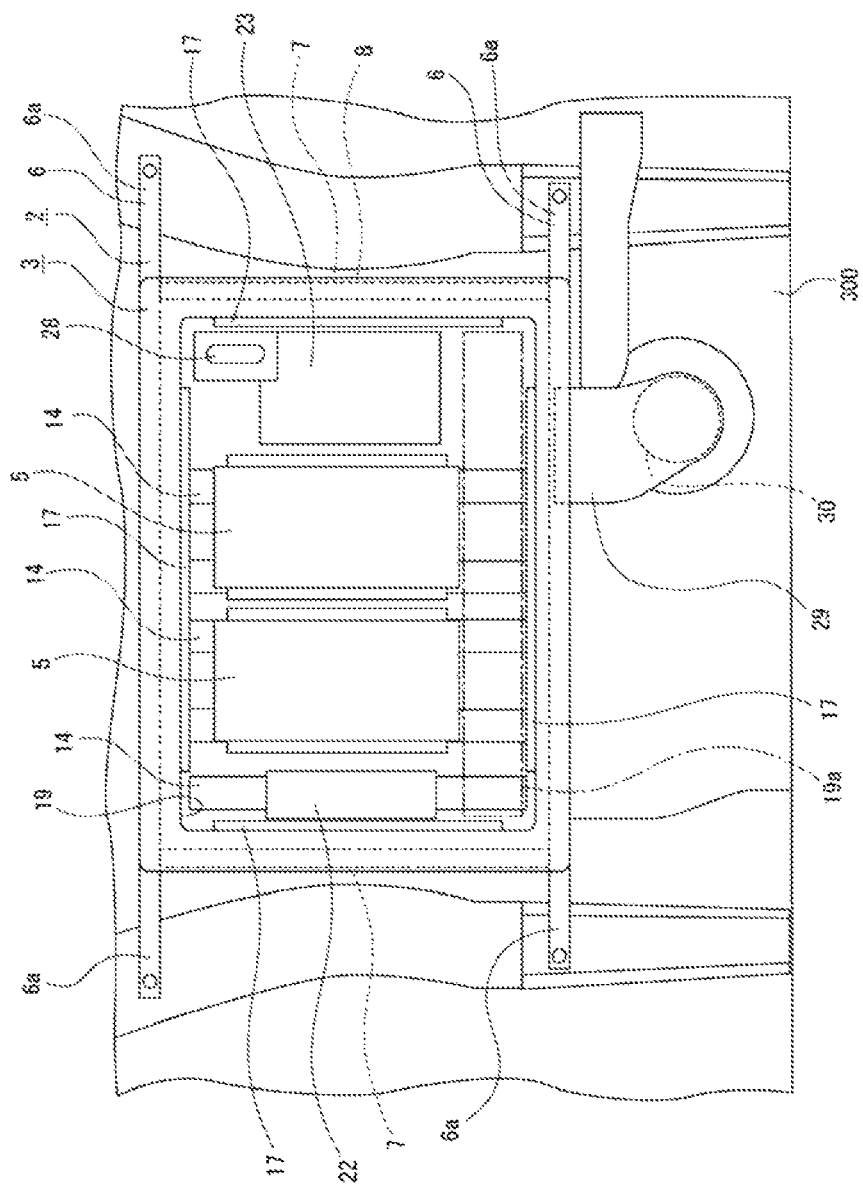
FIG. 10 is a plan view illustrating a state or the like of disposition of each component in a housing case.

Each component (e.g., the two battery modules 5) is disposed in the internal space 19 of the housing case 3, and in the internal space 19, a gap is formed behind the two battery modules 5, the battery control unit 22, and the junction box 23, which gap is formed as a housing part 19a (see FIG. 10).

The onboard battery 1 is provided with an intake duct 29 (see FIG. 2). The intake duct 29 penetrates the housing case 3 and, except for a part of it, is located in the crushable area 900 formed behind the housing case 3. Inside the intake duct 29 is disposed a fan motor 30 with a large weight. The fan motor 30 is located at the same height as the lower housing part 11 of the housing case 3, being disposed between the two rear side frames 700.

To a rotating shaft of the fan motor 30 is coupled a cooling fan (not illustrated). The cooling fan has a function of taking in cooling air from the intake duct 29 and sending the cooling air to each component disposed inside the housing case 3 by being rotated.

The fan motor 30 is located right behind the junction box 23, for example, in the crushable area 900 (see FIG. 10). Accordingly, the fan motor 30 is located on the right relative to a right end of the battery module 5 disposed on the right side. Note that the fan motor 30 may be located on the left relative to a left end of the battery module 5 disposed on the left side.

The onboard battery 1 is provided with an exhaust duct 31 (see FIG. 2). The exhaust duct 31 penetrates the housing case 3 and, except for a part of it, is located beside (on the left of) the housing case 3. The cooling air taken in from the intake duct 29 to cool each component disposed inside the housing case 3 is released outside the housing case 3 by the exhaust duct 31.

The cooling fan forcedly performs the above-described flow of the cooling air passing from the intake duct 29 through the inside of the housing case 3 to be released by the exhaust duct 31, efficiently cooling each component disposed inside the housing case 3, particularly the two battery modules 5, the battery control unit 22, the junction box 23, and the like.

If a vehicle that is equipped with the onboard battery 1 configured as described above is collided with from behind by another vehicle with a high vehicle height, such as a truck, a load due to a shock from the another vehicle is applied to the upper stage of the housing case 3, because rear side frames and a bumper beam of the another vehicle (e.g., truck) are present at a higher position than the two rear side frames 700 and the bumper beam 800 of the vehicle equipped with the onboard battery 1.

When a load due to a shock from the another vehicle is applied to the upper stage of the housing case 3, there is a possibility that a load is applied to the terminal strip 24, the pump inverter 25, the DC/DC converter 26, and the unit inverter 27 housed in the upper stage of the housing case 3, but a load is unlikely to be applied to the two battery modules 5, the battery control unit 22, and the junction box 23 housed in the lower stage. Accordingly, the two battery modules 5, the battery control unit 22, and the junction box 23 are protected.

On the other hand, if the vehicle equipped with the onboard battery 1 is collided with from behind by another vehicle with a low vehicle height, such as a car, the two rear side frames 700 and the bumper beam 800 are crushed to absorb a shock behind the housing case 3, because the two rear side frames 700 and the bumper beam 800 of the vehicle equipped with the onboard battery 1 is at substantially the same height as rear side frames and a bumper beam of the another vehicle (e.g., car).

As described above, when a vehicle with a low vehicle height (e.g., car) collides, the two rear side frames 700 and the bumper beam 800 absorb a shock. This prevents application of a large load to the housing case 3, thus retaining the housing case 3 in a state of being disposed in the trunk 200 to protect the onboard battery 1.

If the vehicle equipped with the onboard battery 1 is collided with from behind by another vehicle with a low vehicle height, such as a car, and the collision is severe, a load is applied to the housing case 3 after the two rear side frames 700 and the bumper beam 800 are crushed to absorb a shock.

In this case, since the three shock-absorbing members 14 are mounted on the housing case 3, the three shock-absorbing members 14 absorb a shock, which prevents application of a large load to the housing case 3 to protect each component disposed inside the housing case 3.

Furthermore, in the vehicle equipped with the onboard battery 1, if a rear part of the vehicle equipped with the onboard battery 1 collides with a telegraph pole etc. due to spin or the like (i.e., if so-called pole collision occurs), the telegraph pole etc. enters the space between the two rear side frames 700 to apply a large load to the housing case 3. Also in a severe collision, a large load is applied to the housing case 3 depending on the degree of the collision. Furthermore, in this case, there is a possibility that the fan motor 30 with a large weight disposed in the crushable area 900 is moved forward by the collision to apply a large load to the housing case 3.

When a large load is applied to the housing case 3 from behind in this manner, forward moving force is applied to the housing case 3 to allow the housing case 3 to move diagonally up-forward along the inclined surface part 300a of the floor panel 300.

Figure 11:
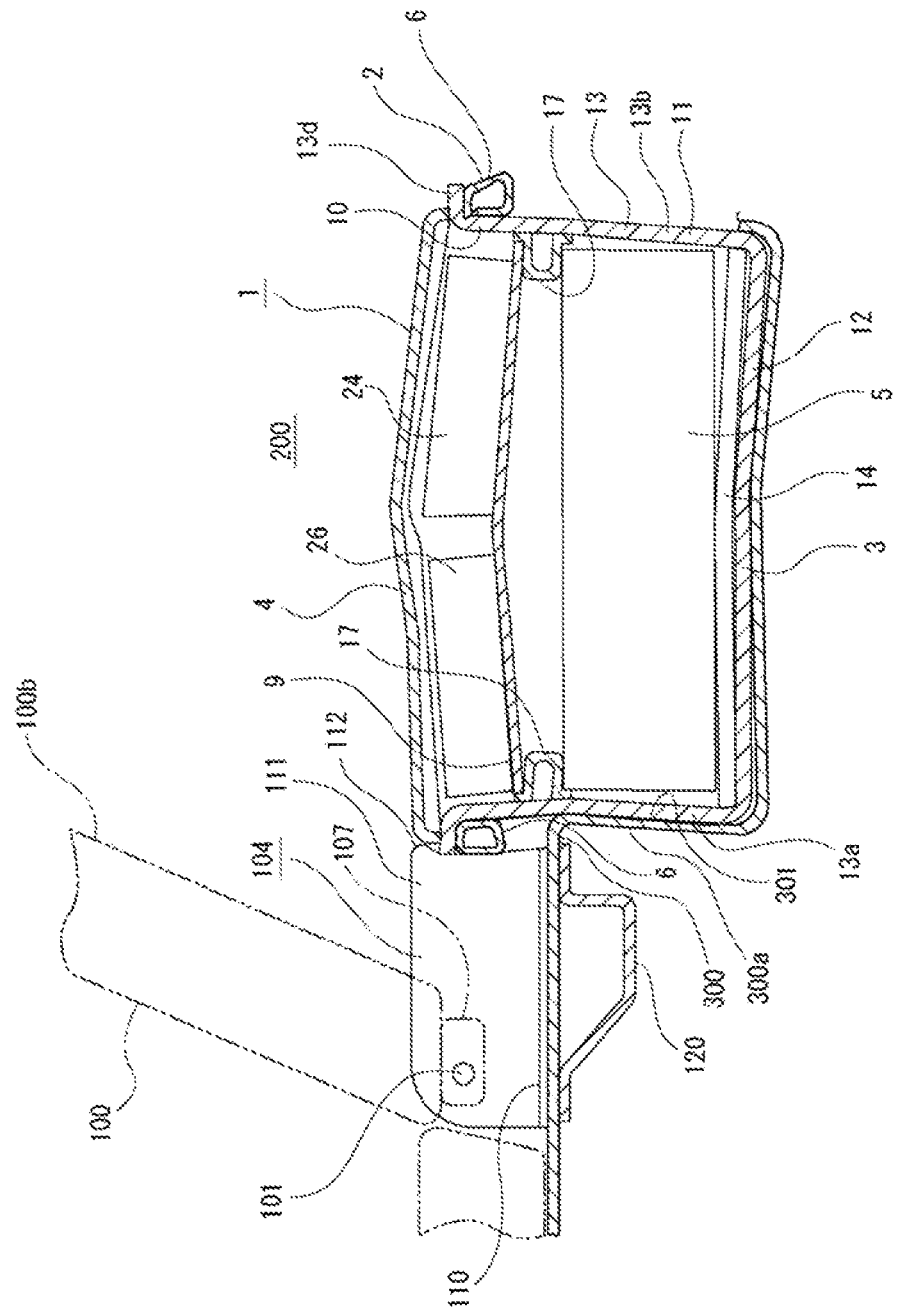
FIG. 11 is a cross-sectional view illustrating a state where movement of an onboard battery is restricted in collision.

However, since the displacement restricting part 112 that is formed to be perpendicular or substantially perpendicular and whose rear surface faces rearward or substantially rearward is present at a position facing the first portion 6 on the front side of the holding frame 2, the first portion 6 comes into contact with the displacement restricting part 112, so that diagonal up-forward movement of the housing case 3 is restricted (see FIG. 11).

Accordingly, the front wall part 13a of the housing case 3 does not come into contact with a portion with high rigidity in the vehicle body, such as a portion where the seat hinge bracket 104 and the floor panel 300 are coupled to the cross-member 120, or, even if it does, does not come into contact in a state of having large force; thus, the front wall part 13a is unlikely to bend. This prevents the housing case 3 from being damaged and prevents each component disposed inside the housing case 3 from being damaged or broken in collision.

Even when the fan motor 30 with a large weight is moved forward by the collision to apply a load to the housing case 3, since the fan motor 30 is located on the left or right of the two battery modules 5 in the transversal direction as described above, the fan motor 30 does not come into contact with the two battery modules 5, which allows protection of the two battery modules 5.

Figure 12:
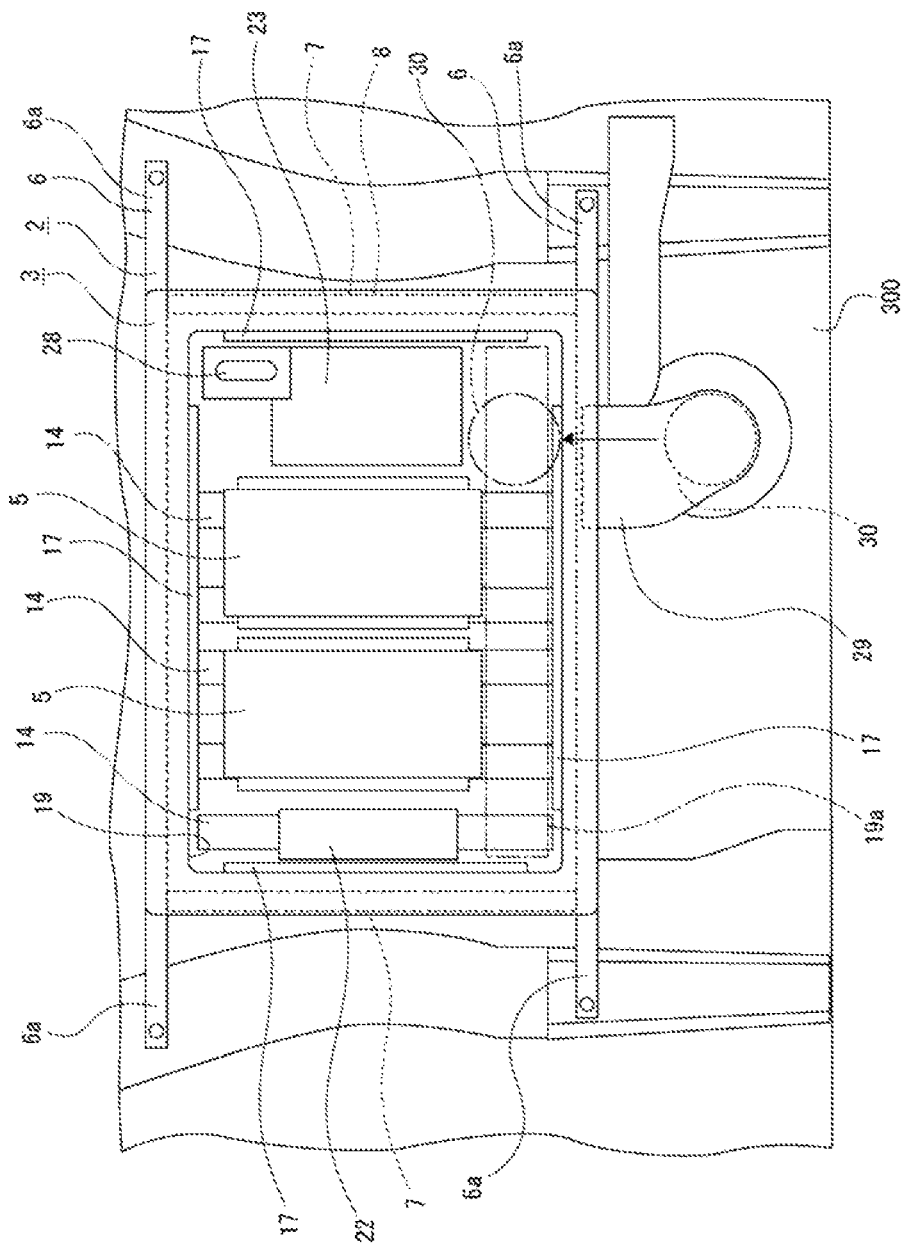
FIG. 12 is a plan view illustrating a state regarding a fan motor in collision.

There is also a possibility that the fan motor 30 breaks through the housing case 3 to be moved forward to the inside of the housing case 3, but since a rear end portion of the internal space 19 of the housing case 3 is formed as the housing part 19a, the fan motor 30 is housed in the housing part 19a when moved forward to the inside of the housing case 3 (see FIG. 12).

Accordingly, contact is avoided between the functional component and each component disposed inside the housing case 3, particularly the junction box 23 and the two battery modules 5. This prevents each component disposed inside the housing case 3 from being damaged or broken in collision.

As described above, diagonal up-forward movement of the housing case 3 is restricted by the displacement restricting part 112. Since the displacement restricting part 112 is provided on the seat hinge bracket 104 supporting the turning shaft 101 of the rear seats 100, there is no need to provide a dedicated displacement restricting part for restricting the movement of the housing case 3, which allows the onboard battery 1 to be protected with a simple structure.

In addition, since the seat hinge bracket 104 provided with the displacement restricting part 112 is fixed to the cross-member 120 with the floor panel 300 located therebetween, thus having high strength, upward displacement of the housing case 3 can be surely restricted.

Furthermore, since the reinforcing member 17 is mounted on the inner surface of the front wall part 13a of the housing case 3 and the lower end portion of the displacement restricting part 112 is located at the same height as the reinforcing member 17, the reinforcing member 17 suppresses deformation of the housing case 3 when the housing case 3 comes into contact with the displacement restricting part 112. This protects each component disposed inside the housing case 3.

Described above is an example in which the displacement restricting part 112 is formed on the seat hinge bracket 104. Alternatively, the displacement restricting part 112 may be formed on at least one of the other seat hinge brackets 102, 103, and 105, besides the seat hinge bracket 104.

A displacement restricting part may be formed on another portion included in the vehicle, besides the seat hinge brackets 102, 103, 104, and 105.

Modifications of a seat hinge bracket including a displacement restricting part will be described below (see FIGS. 13 to 18).

Figure 13:
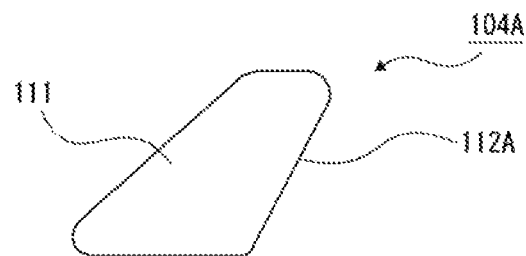
FIG. 13 is a side view of a seat hinge bracket according to a first modification.

As illustrated in FIG. 13, in a seat hinge bracket 104A according to a first modification, a displacement restricting part 112A is formed as an inclined edge that undergoes rearward displacement as going upward.

Regarding the seat hinge bracket 104A, when the first portion 6 of the holding frame 2 comes into contact with the displacement restricting part 112A in collision of the vehicle, the displacement restricting part 112A restricts forward and upward movement of the onboard battery 1.

Figure 14:
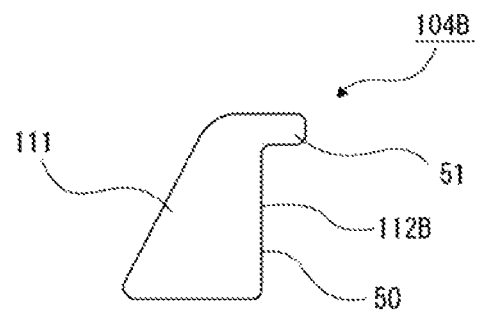
FIG. 14 is a side view of a seat hinge bracket according to a second modification.

As illustrated in FIG. 14, in a seat hinge bracket 104B according to a second modification, a displacement restricting part 112B includes a restricting edge 50 extending in the vertical direction and a projecting part for restriction 51 that is continuous with an upper end of the restricting edge 50 and projects rearward beyond the restricting edge 50.

Regarding the seat hinge bracket 104B, when the first portion 6 of the holding frame 2 comes into contact with the displacement restricting part 112B in collision of the vehicle, the restricting edge 50 restricts forward movement of the onboard battery 1 and the projecting part for restriction 51 restricts upward movement of the onboard battery 1.

Since the projecting part for restriction 51 projecting rearward is provided at an upper end portion of the displacement restricting part 112B in this manner, the first portion 6 of the holding frame 2 comes into contact with the projecting part for restriction 51, so that upward movement of the onboard battery 1 is restricted. This allows upward movement of the onboard battery 1 to be surely restricted with a simple structure.

Figure 15:
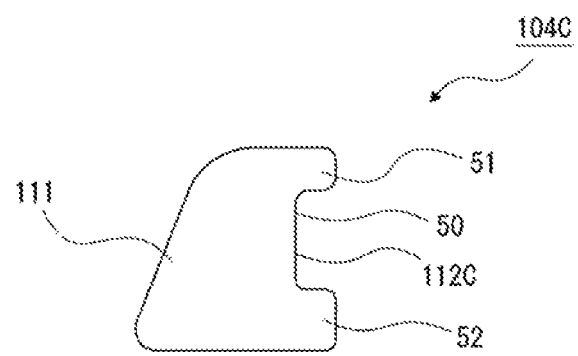
FIG. 15 is a side view of a seat hinge bracket according to a third modification.

As illustrated in FIG. 15, in a seat hinge bracket 104C according to a third modification, a displacement restricting part 112C includes the restricting edge 50 extending in the vertical direction, the projecting part for restriction 51 that is continuous with an upper end of the restricting edge 50 and projects rearward beyond the restricting edge 50, and a projecting part 52 that is continuous with a lower end of the restricting edge 50 and projects rearward beyond the restricting edge 50.

Regarding the seat hinge bracket 104C, when the first portion 6 of the holding frame 2 comes into contact with the displacement restricting part 112C in collision of the vehicle, the restricting edge 50 restricts forward movement of the onboard battery 1 and the projecting part for restriction 51 restricts upward movement of the onboard battery 1. In addition, the first portion 6 is inserted between the projecting part for restriction 51 and the projecting part 52 to allow the movement of the onboard battery 1 to be surely restricted.

Since the projecting part for restriction 51 projecting rearward is provided at an upper end portion of the displacement restricting part 112C in this manner, the first portion 6 of the holding frame 2 comes into contact with the projecting part for restriction 51, so that upward movement of the onboard battery 1 is restricted. This allows upward movement of the onboard battery 1 to be surely restricted with a simple structure.

Figure 16:
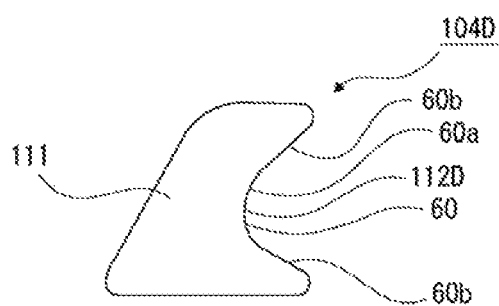
FIG. 16 is a side view of a seat hinge bracket according to a fourth modification.

As illustrated in FIG. 16, in a seat hinge bracket 104D according to a fourth modification, a displacement restricting part 112D is formed by a depressed restricting edge 60 having a rearward opening, and the restricting edge 60 includes a curved part 60*a* and two straight parts 60*b* continuous with upper and lower both ends of the curved part 60*a*.

Regarding the seat hinge bracket 104D, when the first portion 6 of the holding frame 2 comes into contact with the displacement restricting part 112D in collision of the vehicle, the first portion 6 is inserted into the depressed portion to allow the movement of the onboard battery 1 to be surely restricted.

Figure 17:
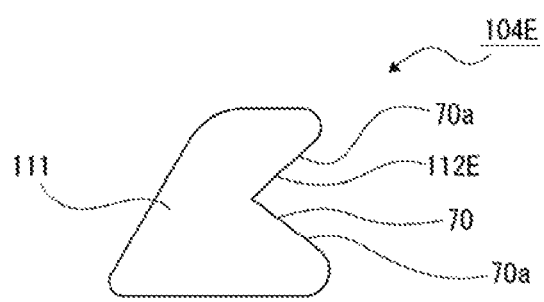
FIG. 17 is a side view of a seat hinge bracket according to a fifth modification.

As illustrated in FIG. 17, in a seat hinge bracket 104E according to a fifth modification, a displacement restricting part 112E is formed by a depressed restricting edge 70 having a rearward opening, and the restricting edge 70 has a V-shape formed by two straight parts 70*a*.

Regarding the seat hinge bracket 104E, when the first portion 6 of the holding frame 2 comes into contact with the displacement restricting part 112E in collision of the vehicle, the first portion 6 is inserted into the depressed portion to allow the movement of the onboard battery 1 to be surely restricted.

Figure 18:
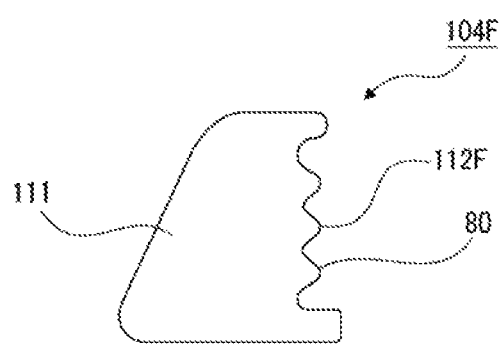
FIG. 18 is a side view of a seat hinge bracket according to a sixth modification.

As illustrated in FIG. 18, in a seat hinge bracket 104F according to a sixth modification, a displacement restricting part 112F is formed by a restricting edge 80 having projections and depressions.

Regarding the seat hinge bracket 104F, when the first portion 6 of the holding frame 2 comes into contact with the displacement restricting part 112F in collision of the vehicle, the restricting edge 80 having projections and depressions restricts the movement of the onboard battery 1.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle body structure for a vehicle equipped with a battery including one or more battery modules, the vehicle body structure comprising:
a holding frame that includes a frame-shaped part;
a housing case configured to be inserted into the frame-shaped part,
wherein the one or more battery modules are housed in the housing case,
wherein an outer peripheral edge part of the housing case is fixed to the frame-shaped part with a fixing member to fix the housing case to the holding frame;
a displacement restricting part configured to restrict an upward displacement of the battery in a collision from behind the vehicle, wherein the displacement restricting part is at a position that faces a front end portion of the holding frame, and wherein an upper end portion of the displacement restricting part comprises a projecting part that projects rearward; and
a disposition depression in a floor panel, wherein the battery is at least partly inserted in the disposition depression.

2. The vehicle body structure according to claim 1, wherein the displacement restricting part is on a seat hinge bracket, wherein the seat hinge bracket is configured to support a turning shaft of rear seats.

3. The vehicle body structure according to claim 2, wherein
a reinforcing member is mounted on an inner surface of a front end portion of the housing case, and
a lower end portion of the displacement restricting part is at a same height as a height of the reinforcing member.

4. The vehicle body structure according to claim 2, wherein the seat hinge bracket is fixed to a cross-member with the floor panel, wherein the floor panel is between the seat hinge bracket and the cross-member.

5. The vehicle body structure according to claim 4, wherein
a reinforcing member is mounted on an inner surface of a front end portion of the housing case, and
a lower end portion of the displacement restricting part is at a same height as a height of the reinforcing member.

6. The vehicle body structure according to claim 1,
wherein a seat hinge bracket is fixed to a cross-member with the floor panel, wherein the floor panel is between the seat hinge bracket and the cross-member, and
wherein the seat hinge bracket is configured to support a turning shaft of rear seats.

7. The vehicle body structure according to claim 6, wherein
a reinforcing member is mounted on an inner surface of a front end portion of the housing case, and
a lower end portion of the displacement restricting part is at a same height as a height of the reinforcing member.

8. The vehicle body structure according to claim 1, wherein
a reinforcing member is mounted on an inner surface of a front end portion of the housing case, and
a lower end portion of the displacement restricting part is at a same height as a height of the reinforcing member.

9. The vehicle body structure according to claim 1, wherein a lower surface of a mounted part of the housing case is in contact with an upper surface of the frame-shaped part of the holding frame.

10. A battery for a vehicle including one or more battery modules, comprising:
a holding frame including a frame-shaped part;
a housing case configured to be inserted into the frame-shaped part, wherein the one or more battery modules are housed in the housing case,
wherein an outer peripheral edge part of the housing case is fixed to the frame-shaped part with a fixing member to fix the housing case to the holding frame,
wherein the battery is at least partly inserted into a disposition depression in a floor panel of the vehicle; and
a front end portion of the holding frame is at a position that faces a displacement restricting part of the vehicle, wherein the displacement restricting part restricts an upward displacement of the battery in a collision from behind the vehicle, and wherein an upper end portion of the displacement restricting part comprises a projecting part that projects rearward.

11. The battery according to claim 10, wherein
a reinforcing member is mounted on an inner surface of a front end portion of the housing case, and
the reinforcing member is at a same height as a height of a lower end portion of the displacement restricting part.

12. A vehicle body structure for a vehicle equipped with a battery including one or more battery modules, the vehicle body structure comprising:
a holding frame that includes a frame-shaped part;
a housing case configured to be inserted into the frame-shaped part, wherein the at least one battery module is housed in the housing case, wherein an outer peripheral edge part of the housing case is fixed to the frame-shaped part with a fixing member to fix the housing case to the holding frame, and wherein a lower surface of a mounted part of the housing case is in contact with an upper surface of the frame-shaped part of the holding frame;

a displacement restricting part configured to restrict an upward displacement of the battery in a collision from behind the vehicle, wherein the displacement restricting part is at a position that faces a front end portion of the holding frame; and a disposition depression in a floor panel, wherein the battery is at least partly inserted in the disposition depression.

* * * * *